United States Patent
Shimodake et al.

(10) Patent No.: US 10,086,540 B2
(45) Date of Patent: Oct. 2, 2018

(54) METHOD FOR MANUFACTURING PRESS MOLDED PRODUCT AND MANUFACTURING APPARATUS FOR PRESS MOLDED PRODUCT

(71) Applicant: Teijin Limited, Osaka-shi, Osaka (JP)

(72) Inventors: Ryo Shimodake, Osaka (JP); Hodaka Yokomizo, Osaka (JP)

(73) Assignee: Teijin Limited, Osaka-Shi, Osaka (JP)

( * ) Notice: Subject to any disclaimer, the term of this patent is extended or adjusted under 35 U.S.C. 154(b) by 257 days.

(21) Appl. No.: 15/054,819

(22) Filed: Feb. 26, 2016

(65) Prior Publication Data

US 2016/0250785 A1    Sep. 1, 2016

(30) Foreign Application Priority Data

Feb. 27, 2015 (JP) ................. 2015-038378
Feb. 5, 2016 (JP) ................. 2016-021284

(51) Int. Cl.
*B29C 43/58* (2006.01)
*B29C 43/02* (2006.01)
(Continued)

(52) U.S. Cl.
CPC ............ *B29C 43/58* (2013.01); *B29C 43/003* (2013.01); *B29C 2043/5808* (2013.01);
(Continued)

(58) Field of Classification Search
CPC ............ B29K 2307/04; B29K 2077/00; B29K 2105/12; B29C 2043/5808; B29C 43/58; B29C 43/003
See application file for complete search history.

(56) References Cited

U.S. PATENT DOCUMENTS 4,065,519 A * 12/1977 Koch .................. B29C 45/0001
264/122
5,795,510 A    8/1998 Matsumoto et al.
(Continued)

FOREIGN PATENT DOCUMENTS

JP    H09-104025 A    4/1997
JP    2013-052602 A   3/2013
WO    2013/018920 A1  2/2013

OTHER PUBLICATIONS

Aug. 25, 2017—(DE) Office Action—App 102016103427.4—Eng Tran.
(Continued)

*Primary Examiner* — Nahida Sultana
(74) *Attorney, Agent, or Firm* — Banner & Witcoff, Ltd.

(57) ABSTRACT

A method for manufacturing a press-molded product by cold-pressing a composite material containing a discontinuous carbon fiber and a thermoplastic resin, is provided. The method satisfies equations (1) and (2) and includes Steps 1 to 5:

Step 1 is a step of placing a heated composite material in a mold;
Step 2 is a step of allowing 1 second or less between pressurization start time t0 and time t1 of reaching flow starting pressure Pf;
Step 3 is a step of reaching maximum pressure Pm at time t2;
Step 4 is a pressure holding step of pressing the composite material at an average holding pressure Pk from time t2 to time t3; and
Step 5 is a step of opening the mold and taking out a molded product from the mold;

equation (1):    $4 < Pf/t1 < 7{,}500$ [MPa/sec]; and
equation (2):    $45 < Pk \times (t3-t2) < 5{,}400$ [MPa·sec].

7 Claims, 7 Drawing Sheets

(51) Int. Cl.
   *B29C 43/52* (2006.01)
   *B29C 43/00* (2006.01)
   *B29K 77/00* (2006.01)
   *B29K 105/12* (2006.01)
   *B29K 307/04* (2006.01)

(52) U.S. Cl.
   CPC ...... *B29K 2077/00* (2013.01); *B29K 2105/12* (2013.01); *B29K 2307/04* (2013.01)

(56) References Cited

U.S. PATENT DOCUMENTS

| | | | |
|---|---|---|---|
| 6,368,537 B1* | 4/2002 | Sato | B29C 43/183 156/102 |
| 2003/0227107 A1* | 12/2003 | Stewart | B29C 43/183 264/236 |
| 2004/0137067 A1* | 7/2004 | Narang | A61B 17/00491 424/486 |
| 2010/0089255 A1* | 4/2010 | Shimao | B29C 43/36 100/35 |
| 2011/0006460 A1* | 1/2011 | Vander Wel | B29C 43/36 264/403 |
| 2014/0070458 A1* | 3/2014 | Preisler | B29C 51/002 264/322 |
| 2014/0148072 A1 | 5/2014 | Nagakura et al. | |

OTHER PUBLICATIONS

Mahlke, M.: Zur Technologie der Verarbeitung Glasmattenverstarkter Thermoplaste. Dissertation an der TH Aachen, 1989.
Breuer U.; Neitzel, M.: High speed stamp forming of thermoplastic composite sheets. In: Polymers and Polymer Composites, vol. 4, 1996, No. 2, p. 117-123; ISSN: 0967-3911.

* cited by examiner 301
h(1+α)
303
302

TIME t0   h   303

METHOD FOR MANUFACTURING PRESS MOLDED PRODUCT AND MANUFACTURING APPARATUS FOR PRESS MOLDED PRODUCT

TECHNICAL FIELD

The present invention relates to a method for manufacturing a press-molded product by cold-pressing a composite material containing a discontinuous carbon fiber and a thermoplastic resin, and a manufacturing apparatus for the press-molded product.

More specifically, the present invention relates to a manufacturing method ensuring that when manufacturing a press-molded product by allowing a composite material containing a discontinuous carbon fiber and a thermoplastic resin to flow in a mold and to compression-mold the material, the flowability during molding is excellent and the degree of freedom in shape of a press-molded product is enhanced.

BACKGROUND ART

A carbon fiber-reinforced composite material has been widely utilized for structural materials of aircrafts, automobiles, and the like, or for applications in general industries, sports, or the like, such as tennis racket, golf shaft and fishing rod, by making use of its high specific strength and high specific elasticity. The form of the carbon fiber used therefor includes a woven fabric made from continuous fibers, a UD sheet composed of unidirectionally arranged fibers, a random sheet made from cut fibers (discontinuous fibers), a nonwoven fabric, or the like.

In recent years, a composite material using, as a matrix, a thermoplastic resin instead of the conventional thermosetting resin is attracting attention. For example, there has been developed a molding method where a molding material impregnated with a discontinuous carbon fiber and a thermoplastic resin is heated to not less than the softening point (plasticization temperature) of the thermoplastic resin, charged into a mold adjusted to not more than the melting point or not more than the glass transition temperature, and then shaped by mold clamping (Patent Documents 1 and 2).

Patent Document 1 describes a molded product having a smooth surface and a uniform thickness, which is obtained by press-molding an easily flowable molding material containing a discontinuous carbon fiber in a specific form and a thermoplastic resin, and a manufacturing method thereof.

Patent Document 2 has proposed a technique for manufacturing a complicatedly shaped or large-size molded product by applying low-pressure molding and thereby allowing the flow of a molding material containing a discontinuous carbon fiber and a thermoplastic resin so as to prevent an increase in the capacity of a molding machine or utility equipment.

Patent Document 3 describes a method for obtaining a molded product with excellent surface transferability and good surface appearance by controlling the acceleration region from the start of pressing of a molten thermoplastic resin until the compression rate reaches a maximum rate.

RELATED ART

Patent Document

[Patent Document 1] JP-A-2013-52602 (the term "JP-A" as used herein means an "unexamined published Japanese patent application")

[Patent Document 2] International Publication No. 2013/018920

[Patent Document 3] JP-A-9-104025

SUMMARY OF THE INVENTION

Problems that the Invention is to Solve

However, the invention described in Patent Document 1 does not take into account the behavior of a composite material during molding, and it is not necessarily clear whether the method can cope with a more complicated shape by increasing the fluidity. Similarly, the invention described in Patent Document 2 does not take into account the time until reaching the flow starting pressure, and it is not necessarily clear whether the technique can cope with a more complicated shape.

Patent Document 3 is a technique relating to press-molding of a thermoplastic resin and cannot be directly applied to a composite material containing a discontinuous carbon fiber and a thermoplastic resin.

Accordingly, the problem to be solved by the present invention is related to a method for manufacturing a press-molded product by cold-pressing a composite material containing a discontinuous carbon fiber and a thermoplastic resin, and an object of the present invention is to solve the problems of those conventional techniques and provide a method for manufacturing a press-molded product excellent in the degree of freedom in shape, which can cope with various shapes.

Means for Solving the Problems

As a result of intensive studies, the present inventors have found that the object above can be attained by the following means, and the present invention has been accomplished based on this finding.

1. A method for manufacturing a press-molded product by cold-pressing a composite material containing a discontinuous carbon fiber and a thermoplastic resin, the method satisfying equations (1) and (2) and including Steps 1 to 5:

Step 1 is a step of placing a heated composite material in a mold;

Step 2 is a step of allowing 1 second or less between pressurization start time t0 and time t1 of reaching flow starting pressure Pf;

Step 3 is a step of reaching maximum pressure Pm at time t2;

Step 4 is a pressure holding step of pressing the composite material at an average holding pressure Pk from time t2 to time t3; and Step 5 is a step of opening the mold and taking out a molded product from the mold;

equation (1): $4 < Pf/t1 < 7{,}500$ [MPa/sec]; and equation (2): $45 < Pk \times (t3-t2) < 5{,}400$ [MPa·sec].

2. The method for manufacturing a press-molded product according to 1, wherein a relationship between pressures Pm and Pf, and times t1 and t2 satisfies equation (3):

Formula (3): $4 < (Pm-Pf)/(t2-t1) < 7{,}500$ [MPa/sec].

3. The method for manufacturing a press-molded product according to 1 or 2, wherein the maximum pressure Pm and the average holding pressure Pk satisfy $0.5 < Pk/Pm < 1.0$.

4. The method for manufacturing a press-molded product according to any one of 1 to 3, wherein the maximum pressure Pm is from 5 to 50 MPa.

5. The method for manufacturing a press-molded product according to any one of 1 to 4, wherein an average fiber length of the discontinuous carbon fiber is from 1 to 100 mm.

6. The method for manufacturing a press-molded product according to any one of 1 to 5, wherein a volume fraction of the carbon fiber contained in the composite material, defined by equation (6), is from 10 to 70 Vol %:

equation (6)    $Vf=100\times$volume of carbon fiber/(volume of carbon fiber+volume of thermoplastic resin).

7. The method for manufacturing a press-molded product according to any one of 1 to 6, wherein the thermoplastic resin is a polyamide resin.

8. An apparatus for manufacturing a press-molded product by cold-pressing a composite material containing a discontinuous carbon fiber and a thermoplastic resin, wherein said cold press satisfies equations (1) and (2) and includes Steps 1 to 5, the apparatus including a speed-increasing device provided in a mold opening and closing machine:

Step 1 is a step of placing a heated composite material in a mold;

Step 2 is a step of allowing 1 second or less between pressurization start time t0 and time t1 of reaching flow starting pressure Pf;

Step 3 is a step of reaching maximum pressure Pm at time t2;

Step 4 is a pressure holding step of pressing the composite material at average holding pressure Pk from time t2 to time t3; and Step 5 is a step of opening the mold and taking out a molded product from the mold:

equation (1):    $4<Pf/t1<7,500$ [MPa/sec]; and equation (2):    $45<Pk\times(t3-t2)<5,400$ [MPa·sec].

9. The method for manufacturing a press-molded product according to any one of 1 to 7, using a manufacturing apparatus in which a speed-increasing device is provided in a mold opening and closing machine.

Advantage of the Invention

In the case of using the manufacturing method of a press-molded product or the manufacturing apparatus of a press-molded product of the present invention, the composite material reaches a flow starting pressure immediately after the start of pressurization to allow the flow of the composite material with a high flow velocity, and thereby the non-fluidized surface and the fluidized surface can be pressurized substantially at the same time. This leads to a remarkably enhanced mold-filling property, as a result, the non-fluidized surface and the fluidized surface are pressurized to the same level, and the degree of freedom in shape of a press-molded product is greatly improved.

Accordingly, even in the case of a complicated three-dimensional structure, when the manufacturing method of a press-molded product or the production apparatus of a press-molded product of the present invention is used, a composite material can flow a relatively long distance at the time of pressing the composite material, and even a protrusion or a thin space can be filled with the composite material.

MODE FOR CARRYING OUT THE INVENTION

Figure 1A:
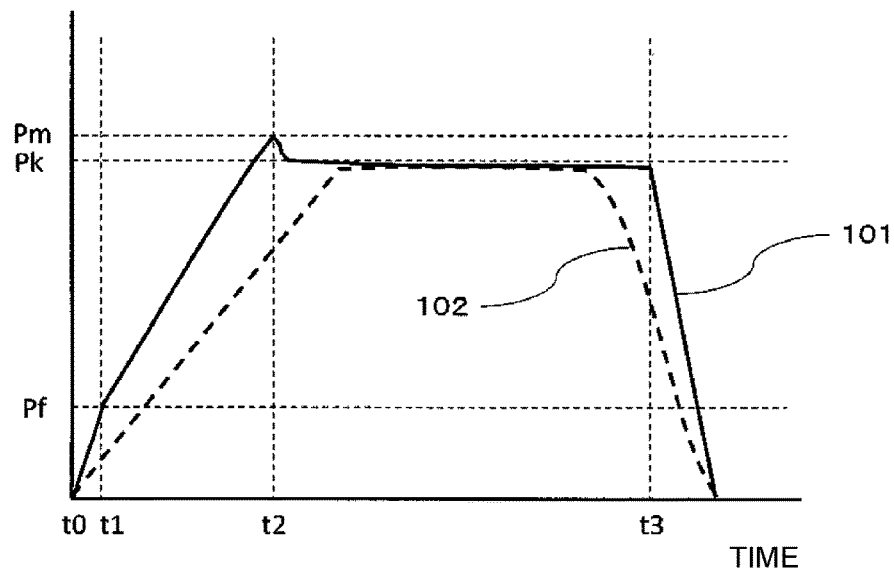
FIG. 1A An explanatory view of properties regarding the manufacturing method of a press-molded product of the present invention.

The manufacturing method of a press-molded product of the present invention is a method for manufacturing a press-molded product by cold-pressing a composite material containing a discontinuous carbon fiber and a thermoplastic resin, the method satisfying equations (1) and (2) and comprising Steps 1 to 5:

Step 1 is a step of placing a heated composite material in a mold;

Step 2 is a step of allowing 1 second or less between pressurization start time t0 and time t1 of reaching flow starting pressure Pf;

Step 3 is a step of reaching maximum pressure Pm at time t2;

Step 4 is a pressure holding step of pressing the composite material at an average holding pressure Pk from time t2 to time t3; and Step 5 is a step of opening the mold and taking out a molded product from the mold;

equation (1):    $4<Pf/t1<7,500$ [MPa/sec]; and equation (2):    $45<Pk\times(t3-t2)<5,400$ [MPa·sec].

[Carbon Fiber]

As the carbon fiber, a polyacrylonitrile (PAN)-based carbon fiber, a petroleum/coal pitch-based carbon fiber, a rayon-based carbon fiber, a cellulose-based carbon fiber, a lignin-based carbon fiber, a phenol-based carbon fiber, a vapor grown carbon fiber, and the like, are generally known, and in the present invention, any of these carbon fibers may be suitably used.

Among others, in the present invention, a polyacrylonitrile (PAN)-based carbon fiber is preferably used because of its excellent tensile strength. In the case of using a PAN-based carbon fiber as the carbon fiber, the tensile modulus thereof is preferably from 100 to 600 GPa, more preferably from 200 to 500 GPa, still more preferably from 230 to 450 GPa. The tensile strength is preferably from 2,000 to 10,000 MPa, more preferably from 3,000 to 8,000 MPa.

The carbon fiber for use in the present invention may be a carbon fiber in which a sizing agent is adhered to the surface thereof. In the case of using a sizing agent-adhered carbon fiber, the kind of the sizing agent may be appropriately selected according to the kinds of the carbon fiber and a matrix resin and is not particularly limited.

[Form of Carbon Fiber]
(Fiber Length)

The carbon fiber for use in the present invention may be sufficient as long as it is discontinuous, and the fiber length thereof may be appropriately determined according to the kind of the carbon fiber, the kind of the thermoplastic resin, the orientation state of carbon fibers in the composite material or the like, and is not particularly limited. The average fiber length of the discontinuous carbon fiber is, usually, preferably from 0.1 to 500 mm, more preferably from 1 to 100 mm, still more preferably from 5 to 80 mm, yet still more preferably from 10 to 80 mm, and most preferably from 10 to 60 mm. When the average fiber length is 500 mm or less, the degree of freedom in shape of a press-molded product is enhanced without significantly reducing the flowability of the composite material, and when the average fiber length is 0.1 mm or more, the composite material and a compression-molded product are advantageously less likely to decrease in the mechanical strength.

In the present invention, carbon fibers with different fiber lengths from each other may be used in combination. In other words, the carbon fiber for use in the present invention may be a carbon fiber having a single peak for the average fiber length or a carbon fiber having plural peaks.

The average fiber length of the carbon fiber can be determined based on the following formula (5) by measuring the fiber lengths of randomly extracted 100 fibers down to a unit of 1 mm by using a vernier caliper or the like. The average fiber length is preferably measured as a weight average fiber length (Lw) calculated so as to attach importance to those having a long fiber length.

When the fiber length of individual carbon fibers is Li and the number of carbon fibers measured is j, the number average fiber length (Ln) and the weight average fiber length (Lw) are determined according to the following equations (4) and (5):

$$Ln=\Sigma Li/j \qquad \text{equation (4)}$$

$$Lw=(\Sigma Li^2)/(\Sigma Li) \qquad \text{equation (5)}$$

Here, when the fiber length is a constant length, the number average fiber length and the weight average fiber length take on the same value. Extraction of a carbon fiber from the composite material can be performed, for example, by applying a heat treatment under the conditions of approximately 500° C.×1 hour to the composite material and removing the resin in a furnace.

(Fiber Diameter)

The fiber diameter of the carbon fiber for use in the present invention may be appropriately determined according to the kind of the carbon fiber and is not particularly limited. The average fiber diameter is, usually, preferably from 3 to 50 μm, more preferably from 4 to 12 μm, still more preferably from 5 to 8 μm.

The average fiber diameter as used herein indicates the diameter of a single fiber of the carbon fiber. Accordingly, when the carbon fiber is in the form of a fiber bundle, the fiber diameter indicates not the diameter of the fiber bundle but the diameter of a carbon fiber (single fiber) constituting the fiber bundle. The average fiber diameter of the carbon fiber can be measured by the method described, for example, in JIS R-7607:2000.

(Fiber Volume Fraction)

In the present invention, the volume fraction (hereinafter, sometimes simply referred to as "Vf") of the carbon fiber contained in the composite material, defined by the following equation (6), is not particularly limited, but the carbon fiber volume fraction (Vf) in the composite material is preferably from 10 to 70 Vol %:

equation (6): $Vf=100\times$volume of carbon fiber/(volume of carbon fiber+volume of thermoplastic resin)

When the carbon fiber volume fraction (Vf) in the composite material is 10 Vol % or more, desired mechanical properties are likely to be obtained. On the other hand, when Vf is 70 Vol % or less, the flowability of the molding material is not reduced at the time of preparing a press-molded product, and a desired shape is readily obtained during molding. The carbon fiber volume fraction (Vf) in the composite material is more preferably from 20 to 60 Vol %, still more preferably from 30 to 50 Vol %.

[Thickness of Composite Material]

The thickness of the composite material for use in the present invention is not particularly limited, but as the thickness of the composite material is thicker, the heat capacity of the composite material is larger, leading to an increase in the time after heating in step 1 until the temperature drops to the plasticization temperature or less. For this reason, the thickness of the composite material is preferably 0.01 mm or more.

On the contrary, if the thickness of the composite material is small, the heat capacity of the composite material is reduced and in turn, the temperature after heating in step 1 is likely to drop, as a result, the available molding time is relatively short. However, when the method of the present invention is used, even a composite material having a relatively thin thickness can be press-molded in a short available molding time, and a press-molded product can be manufactured even if it is a thin material that has been conventionally difficult to obtain.

The thickness of the composite material is more preferably from 0.01 mm to less than 100 mm, still more preferably from 0.1 mm to less than 10 mm, yet still more preferably from 1 mm to less than 5 mm.

Here, in the case where the composite material for use in the present invention has a configuration where a plurality of layers are layered, the thickness does not indicate the thickness of each layer but indicates the thickness of the entire composite material resulting from adding up of the thicknesses of respective layers.

The composite material for use in the present invention may have a single-layer structure consisting of a single layer or may have a layered structure in which a plurality of layers is layered. The embodiment where the composite material has a layered structure may be an embodiment where plural layers having the same composition are layered, or an embodiment where plural layers having different compositions from each other are layered.

[Size of Composite Material]

The size of the composite material for use in the present invention is not particularly limited. As the size of the composite material is larger, a higher molding pressure is required, but when the manufacturing method of the present invention is used, molding becomes feasible without adding a large facility. From this viewpoint, the surface area of the composite material is preferably 0.5 m² or more, more preferably 1 m² or more, still more preferably 2 m² or more, yet still more preferably 3 m² or more.

(Fiber Form of Carbon Fiber)

The carbon fiber for use in the present invention may be in a single-fiber form composed of a single fiber or in a fiber-bundle form composed of plural single fibers, irrespective of the kind of the carbon fiber.

The reinforcing fiber for use in the present invention may be composed of only a fiber in a single-fiber form, only a fiber in a fiber-bundle form, or a mixture of both. The fiber bundle as referred to herein indicates that two or more single fibers are approximated by use of a sizing agent, an electrostatic force, or the like. In the case of using a fiber in a fiber-bundle form, the number of single fibers constituting each fiber bundle may be substantially uniform or different among respective fiber bundles.

In the case where the carbon fiber for use in the present invention is in a fiber-bundle form, the number of single fibers constituting each fiber bundle is not particularly limited but is usually from 2 to 100,000.

The carbon fiber is generally in a fiber-bundle form where from several thousands to several ten thousands of filaments are gathered. If the carbon fiber is used as it is, the entangled portion of fiber bundles becomes locally thick, and a thin-walled composite material may be hardly obtained. Therefore, the carbon fiber is usually used after extending or opening the fiber bundle.

The orientation state of the carbon fiber in the composite material includes, for example, a unidirectional arrangement in which major axis directions of carbon fibers are arranged in one direction, and a two-dimensional random arrangement in which the major axis directions above are randomly arranged in the in-plane directions of the composite material.

The orientation state of the reinforcing fiber in the present invention may be either the above-described unidirectional arrangement or two-dimensional random arrangement or may also be a non-regular arrangement (an arrangement state in which major axis directions of carbon fibers are neither completely arranged in one direction nor completely randomed) intermediate between the unidirectional arrangement and the two-dimensional random arrangement. In addition, depending on the fiber length of the carbon fiber, the fibers may be arranged such that the major axis direction of the carbon fiber makes an angle with respect to the in-plane direction of the composite material, may be arranged such that fibers are intertwined cotton-wise or furthermore, may be arranged like a bidirectional fabric woven such as a plain weave and a twill weave, a multiaxial fabric, a nonwoven fabric, a mat, a knit, a braid, or paper obtained by papermaking of a reinforcing fiber.

The carbon fiber in the present invention may be in the state of a carbon fiber mat. The carbon fiber mat indicates a material in which carbon fibers are deposited or intertwined to take on a mat shape. Examples of the carbon fiber mat include a two-dimensional random carbon fiber mat in which major axis directions of carbon fibers are randomly arranged in the in-plane directions of the composite material, and a three-dimensional random carbon fiber mat in which carbon fibers are, for example, intertwined cotton-wise and the major axis directions of reinforcing fibers are randomly arranged in each of XYZ directions.

Here, the orientation mode of two-dimensional random arrangement of the carbon fiber in the composite material can be confirmed, for example, by performing a tensile test based on an arbitrary direction of the composite material and a direction perpendicular thereto, measuring the tensile moduli therein, and determining a ratio (Eδ) that is obtained by dividing the larger value, among the measured values of tensile modulus, by the smaller value. As the ratio of the tensile moduli is closer to 1, the carbon fiber can be evaluated to be two-dimensionally randomly arranged. When the ratio obtained by dividing the larger value, among the measured values of tensile moduli in two orthogonal directions, by the smaller value does not exceed 2, the arrangement is evaluated to be isotropic, and when this ratio does not exceed 1.3, the isotropy is evaluated to be excellent.

The technique for controlling the array direction of the carbon fiber is not particularly limited, but specifically, the control can be achieved by a technique of using a carbon fiber in the shape of a fiber bundle or by using an airlaid method, a carding method or a papermaking method at the time of production of the composite material.

[Thermoplastic Resin]

The thermoplastic resin for use in the present invention is not particularly limited as long as a composite material having a desired strength can be obtained, and the thermoplastic resin may be appropriately selected and used according to the intended use or the like of the press-molded product. The thermoplastic resin is not particularly limited, and a thermoplastic resin having a desired softening point (plasticization temperature) or melting point may be appropriately selected and used according to the intended use or the like of the composite material. A thermoplastic resin having a softening point (plasticization temperature) of 180° C. to 350° C. is usually used, but the present invention is not limited thereto.

The thermoplastic resin includes a polyolefin resin, a polystyrene resin, a polyamide resin, a polyester resin, a polyacetal resin (polyoxymethylene resin), a polycarbonate resin, a (meth)acrylic resin, a polyarylate resin, a polyphenylene ether resin, a polyimide resin, a polyethemitrile resin, a phenoxy resin, a polyphenylene sulfide resin, a polysulfone resin, a polyketone resin, a polyether ketone resin, a thermoplastic urethane resin, a fluorine-based resin, a thermoplastic polybenzimidazole resin, or the like.

The polyolefin resin includes, for example, a polyethylene resin, a polypropylene resin, a polybutadiene resin, a polymethylpentene resin, a vinyl chloride resin, a vinylidene chloride resin, a vinyl acetate resin, and a polyvinyl alcohol resin. The polystyrene resin includes, for example, a polystyrene resin, an acrylonitrile-styrene resin (AS resin), and an acrylonitrile-butadiene-styrene resin (ABS resin). The polyamide resin includes, for example, a polyamide 6 resin (nylon 6), polyamide 11 resin (nylon 11), a polyamide 12 resin (nylon 12), a polyamide 46 resin (nylon 46), a polyamide 66 resin (nylon 66), and a polyamide 610 resin (nylon 610). The polyester resin includes, for example, a polyethylene terephthalate resin, a polyethylene naphthalate resin, a polybutylene terephthalate resin, a polytrimethylene terephthalate, resin, and a liquid crystal polyester. The (meth)acrylic resin includes, for example, a polymethyl methacrylate. The polyphenylene ether resin includes, for example, a modified polyphenylene ether. The polyimide resin includes, for example, a thermoplastic polyimide, a polyamideimide resin, and a polyether imide resin. The polysulfone resin includes, for example, a modified polysulfone resin and a polyethersulfone resin. The polyether ketone resin includes, for example, a polyether ketone resin, a polyether ether ketone resin, and a polyether ketone ketone resin. The fluorine-based resin includes, for example, polytetrafluoroethylene.

The thermoplastic resin for use in the present invention may be only one kind of a resin or may be two or more kinds of resins. The embodiment of using two or more kinds of thermoplastic resins in combination includes, but is not limited to, for example, an embodiment where thermoplastic resins differing in the softening point (plasticization temperature) or melting point from each other are used in combination, and an embodiment where thermoplastic resins differing in the average molecular weight from each other are used in combination.

[Manufacturing Method of Press-molded Product]

The manufacturing method of a press-molded product in the present invention is a method for manufacturing a press-molded product by cold-pressing a composite material containing a discontinuous carbon fiber and a thermoplastic resin, the method satisfying equations (1) and (2) and comprising Steps 1 to 5:

Step 1 is a step of placing a heated composite material in a mold;

Step 2 is a step of allowing 1 second or less between pressurization start time t0 and time t1 of reaching flow starting pressure Pf;

Step 3 is a step of reaching maximum pressure Pm at time t2;

Step 4 is a pressure holding step of pressing the composite material at an average holding pressure Pk from time t2 to time t3; and Step 5 is a step of opening the mold and taking out a molded product from the mold;

equation (1): $4 < Pf/t1 < 7{,}500$ [MPa/sec]; and equation (2): $45 < Pk \times (t3-t2) < 5{,}400$ [MPa·sec].

(Cold Press)

The cold press as used in the present invention indicates a press method where a composite material heated to not less than the plasticization temperature of the thermoplastic resin contained in the composite material is, in step 1, placed in a mold set to less than the plasticization temperature, and then molded, in steps 2 to 4, by clamping the mold and cooling to not more than the plasticization temperature.

The plasticization temperature of the thermoplastic resin can be determined by DSC (Differential Scanning calorimetry). The resin is measured at a temperature rising rate of 10° C./min, and the peak top of a melting peak in a DSC curve obtained is defined as the plasticization temperature.

Not more than the plasticization temperature indicates that in view of ease of shaping of the plasticized molding material and surface appearance of the molded product, the mold is preferably set to a temperature lower by 20° C. to 100° C. than the solidification temperature of the thermoplastic resin constituting the molding material. The preferred embodiment includes, for example, a range of 120° C. to 160° C. in the case of using a polyamide 6 resin as the thermoplastic resin and a range of 80° C. to 120° C. in the case of using a polypropylene resin.

(Press Molding)

The press molding is a method of obtaining a molded product by subjecting various materials including, for example, a metal, a plastic material and a ceramic material, to deformation such as bending, shear or compression by using a processing machine, a mold, a tool, or the like, and examples of the molding style include drawing, deep drawing, flange, corrugation, edge curling, and stamping. Examples of the method for press molding include a metal mold press method of performing molding by using a mold, and a rubber press method (hydrostatic pressure molding method). Among these methods for press molding, in view of molding pressure and degree of freedom in temperature, molding may be performed using a metal-made mold.

(Steps 1 to 5)

1. Step 1

Step 1 is a step of placing a heated composite material in a mold. The heated composite material as used herein means a composite material heated to not less than the plasticization temperature (softening temperature) of the thermoplastic resin contained in the composite material. In addition, the temperature of the mold in which the composite material is placed is set to less than the plasticization of the thermoplastic resin contained in the composite material.

The heated composite material is transported and placed in the lower mold of an opened mold. The heated molding material is transported, for example, by a hand of a person or by a robot and placed in an opened mold. At the time of transportation, in view of safety at work or placement accuracy of a molding material in a mold where press molding is performed, a hand of a person, or a robot is appropriately selected.

2. Step 2

Step 2 is a step of pressing the composite material and is a step of allowing less than 1 second between pressurization start time t0 and time t1 of reaching flow starting pressure Pf.

2.1 Pressurization Start Time to

FIG. 1A depicts the relationship between the pressure in a press mold and the time. Step 2 indicates the process from time t0 to time t1, and pressurization start time t0 in step 2 indicates the time at which a pressure is measured on the output pressure value of a molding machine after the upper mold of a mold comes into contact with the composite material.

Depending on the kind of the composite material, pressurization start time t0 is not necessarily equal to the time at which the upper mold of the mold comes into contact with the composite material. Depending on the degree of fiber orientation, the composite material containing a discontinuous carbon fiber tends to undergo spring back resulting from softening by heating. For example, after the composite material is heated, when the thickness expands a % in the thickness direction due to spring back, even if the upper mold comes into contact with the composite material, the pressure is too small to be measured on the output pressure value of the molding machine.

Figure 3A:
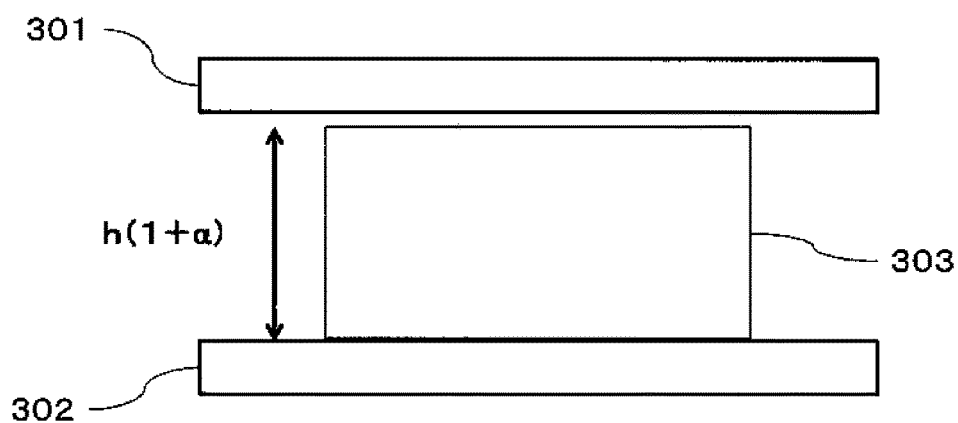
FIG. 3A A schematic view when the composite material is placed in a mold.
Figure 3B:
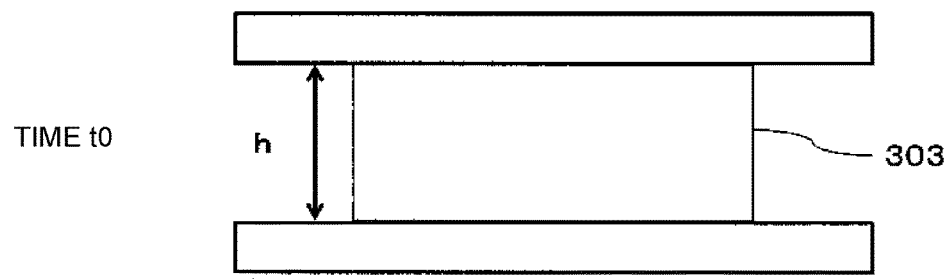
FIG. 3B A schematic view showing pressurization start time t0.

FIG. 3A depicts a configuration where assuming that the thickness before heating of the composite material is h and a ratio of volume increase caused by spring back is α, a composite material having a thickness expanded to h(1+α) is placed in the lower mold of a mold. In the case of press-molding this composite material having undergone spring back, the pressure is measured on the output pressure value of the molding machine after the upper mold is pressed down by the thickness (hα) of the composite material expanded due to spring back (FIG. 3B).

However, such a phenomenon does not occur in a composite material that undergoes absolutely no spring back, and since the pressure is measured at the time when the upper mold of the mold comes into contact with the composite material, the time above is pressurization start time t0.

2.2 Flow Starting Pressure Pf

Figure 3C:
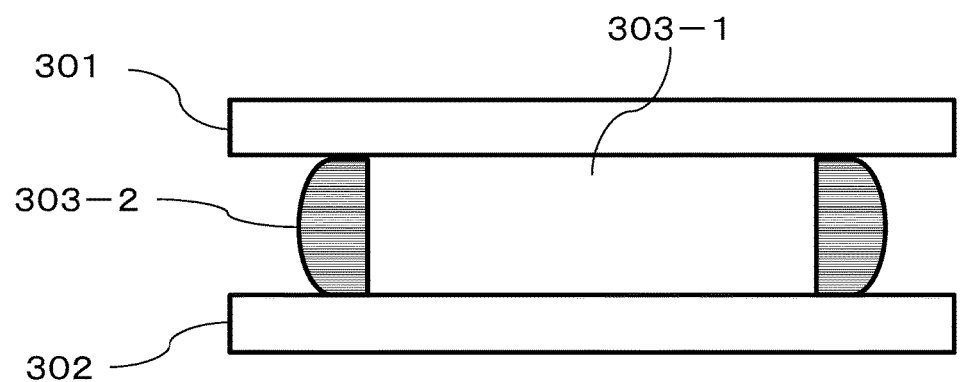
FIG. 3C A schematic view showing how the composite material flows after the flow start time t1 has passed.

The flow starting pressure Pf in step 2 indicates a pressure at which the composite material starts flowing after the composite material is pressurized by the upper mold to further reduce the thickness of the composite material comparing to that before heating. For example, FIG. 3C is a schematic view showing a state where the composite material is flowing.

The surface where the composite material 303-1 and the upper mold 301 are contacted and the surface where the composite material 303-1 and the lower mold 302 are contacted are a non-fluidized surface, because these surfaces of the mold are at a temperature not more than the plasticization temperature and the thermoplastic resin is solidified at the time of coming into contact therewith.

On the other hand, the inside of the composite material 303-1 is maintained at not less than the plasticization temperature and due to a rise in the press pressure, as shown by the composite material 303-2 (the crossed portion in FIG. 3C), the composite material flows. At this time, the surface where the composite material 303-2 and the upper mold 301 are contacted and the surface where the composite material 303-2 and the lower mold 302 are contacted to form a fluidized surface (304 of FIG. 3E).

The flow starting pressure Pf is a pressure unambiguously determined by the kind of the composite material and does not greatly change according to the press conditions.

Measurements by the present inventors have confirmed that as the carbon fiber volume fraction (Vf) is larger, the flow starting pressure Pf tends to be higher.

2.3 One Second or Less Between Time t0 and Time t1

In the present invention, when the length of time between pressurization start time t0 and time t1 of reaching flow starting pressure Pf is 1 second or less, the time from an occasion where a non-fluidized surface (305 of FIG. 3E) is formed and pressurized to an occasion where a fluidized surface (304 of FIG. 3E) is formed and pressurized is very short, and the temperature of the 303-2 portion in FIG. 3C of the composite material can be maintained at not less than the plasticization temperature until immediately before the formation of the fluidized surface.

2.4 Description of Equation (1)

In the present invention, the flow starting pressure Pf and the time t1 satisfy formula (1):

equation (1): $\quad 4 < Pf/t1 < 7{,}500$ [MPa/sec]

Figure 1B:
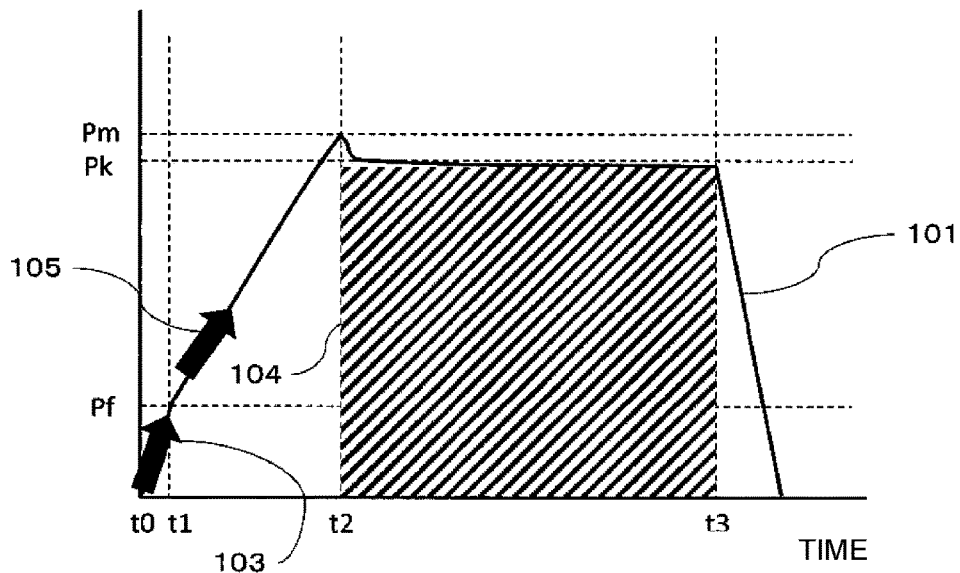
FIG. 1B An explanatory view of properties regarding the manufacturing method of a press-molded product of the present invention.
Figure 2:
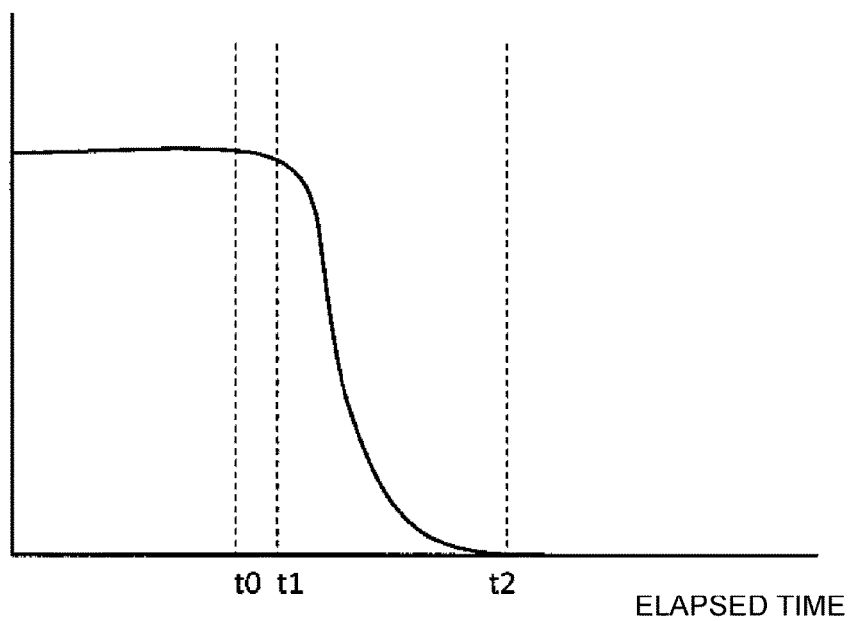
FIG. 2 An explanatory view showing the relationship between the elapsed time and the moving speed of an upper mold when manufacturing a press-molded product.

Equation (1) means the gradient (103 in FIG. 1B) of a graph from time t0 to time t1 in the relationship diagram of "Time-Pressure in Press Mold" of FIG. 1B. As the value of Pf/t1 is larger, the force applied to the composite material per unit time is higher. The Pf/t1 value is preferably $4 < Pf/t1 \leq 5{,}000$, more preferably $4 < Pf/t1 \leq 200$.

If the Pf/t1 value is 4 or less, a problem of reduction in the moldability is caused, and if it is 7,500 or more, a problem that the apparatus or metal mold is broken is caused, which are not preferable.

3. Step 3

Step 3 is a step of pressing the composite material and is a step of reaching maximum pressure Pm at time t2.

The maximum pressure Pm is a pressure at the time where the pressure measured on the output pressure value of a molding machine becomes maximum, and when the upper mold is moved downward at a high speed, a peak value as depicted at time t2 in FIG. 1A often appears.

In the present invention, the relationship among pressures Pm and Pf and times t1 and t2 is not particularly limited but preferably satisfies equation (3):

equation (3): $\quad 4 < (Pm-Pf)/(t2-t1) < 7{,}500$ [MPa/sec]

Equation (3) means the gradient (105 in FIG. 1B) of a graph from time t1 to time t2 in the relationship diagram of "Time-Pressure in Press Mold" of FIG. 1B. As the value of (Pm−Pf)/(t2−t1) is larger, the force applied to the composite material per unit time is higher. The value of (Pm−Pf)/(t2−t1) is preferably $12 < (Pm-Pf)/(t2-t1) < 7{,}500$, more preferably $20 < (Pm-Pf)/(t2-t1) < 7{,}500$.

When the value of (Pm−Pf)/(t2−t1) is larger than 4, the moldability is enhanced, and a problem of production of a thickness difference between the central part and the distal end of a molded product hardly occurs. When the value is less than 7,500, a problem that the apparatus or metal mold is broken is advantageously less likely to be caused, which is preferable.

Here, in order to obtain a preferable value in formula (3), a speed-increasing device can be provided in the mold opening and closing machine.

In the present invention, the time of reaching maximum pressure Pm is not particularly limited, but the time t2 is preferably within 3 seconds from t1, more preferably within 2 seconds, still more preferably within 1.0 second, and most preferably within 0.6 seconds. When the time t2 of reaching maximum pressure Pm in step 3 is 3 seconds or less from time t1 of reaching the flow starting pressure Pf, this is preferred from the standpoint of enhancing the productivity.

The value of maximum pressure Pm is not particularly limited but is preferably from 5 to 50 MPa, more preferably from 10 to 30 MPa.

4. Step 4

4.1 Pressure Holding Step

Step 4 is a pressure holding step of pressing the composite material at average holding pressure Pk from time t2 to time t3 and corresponds to a pressure holding step after roughly shaping the composite material in steps 2 and 3, and this is a step of stabilizing the shape of the molded product. During the process at average holding pressure Pk, the holding pressure Pk preferably keeps the pressurizing force from varying by 4% or more in 1 second after about 1 second has passed since t2 (after 1 second has passed since the point of reaching maximum pressure Pm).

In addition, after about 1 second has passed since t2, the holding pressure is preferably kept from varying by 10% or more, more preferably kept from varying by 5% or more, still more preferably kept from varying by 4% or more, throughout the remaining pressure holding step. The technique for controlling the variation amount of pressure in this way is not particularly limited but, specifically, includes a technique of employing a constant pressure condition as the compression molding condition, and a technique of carrying out the shaping by a molding machine capable of providing the condition for appropriate shaping, for example, capable of controlling the upper mold position of the molding machine.

The relationship between maximum pressure Pm and average holding pressure Pk is not particularly limited but is preferably $0.5 < Pk/Pm < 1.0$, more preferably $0.5 < Pk/Pm < 0.9$, still more preferably $0.5 < Pk/Pm < 0.8$.

When satisfying Pk/Pm<1.0, the molding material in the mold can be shaped in a high-temperature state, and the surface transferability of a molded product is advantageously enhanced, and 0.5<Pk/Pm is preferred in view of limitation of equipment.

More specifically, the average holding pressure Pk is preferably from 0.1 to 50 MPa in view of ease of shaping of the plasticized molding material, ease of control of the thickness of the molded product, and shape stabilization, such as surface property of the press-molded product or filling property in the mold. Above all, the average holding pressure is preferably from 5 to 30 MPa in view of equipment cost of the press-molding machine.

Here, the maximum pressure Pm and the average holding pressure Pk indicate a pressurization force applied to a projected area of the cavity in the opening of the mold.

4.2 Description of Formula (2)

In the present invention, the relationship among average holding pressure Pk, time t3 and time t2 satisfies equation (2):

Equation: $45 < Pk \times (t3-t2) < 5,400$ [MPa·sec]

Pk×(t3−t2) corresponds to the area portion illustrated by diagonal lines in FIG. 1B. When the value of Pk×(t3−t2) is in the range of equation (2), a difference in the surface appearance is not produced between the non-fluidized surface and the fluidized surface, and a molded product with good outer appearance can be manufactured.

The lower limit of Pk×(t3−t2) is preferably 50 [MPa·sec] or more, more preferably 100 [MPa·sec] or more, still more preferably 150 [MPa·sec] or more, yet still more preferably 200 [MPa·sec] or more.

On the other hand, the upper limit is preferably 4,000 [MPa·sec] or less, more preferably 2,000 [MPa·sec] or less, still more preferably 500 [MPa·sec] or less.

4.3 Solidification in Pressure Holding Step

Figure 3D:
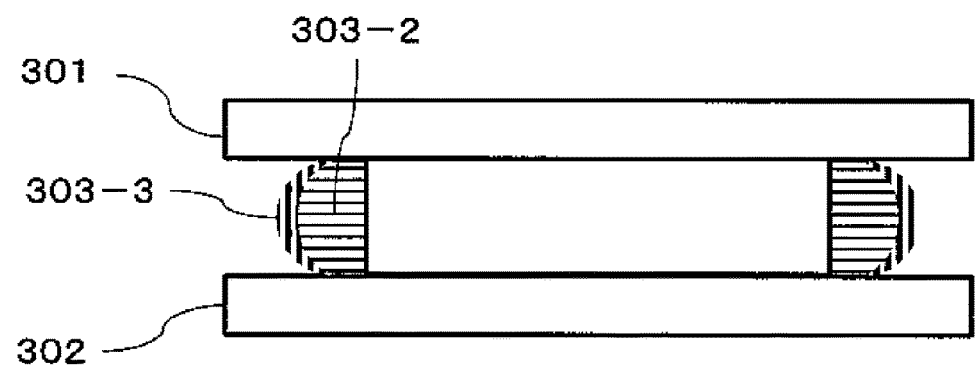
FIG. 3D A schematic view showing how the composite material flows after the flow start time t1 has passed.
Figure 3E:
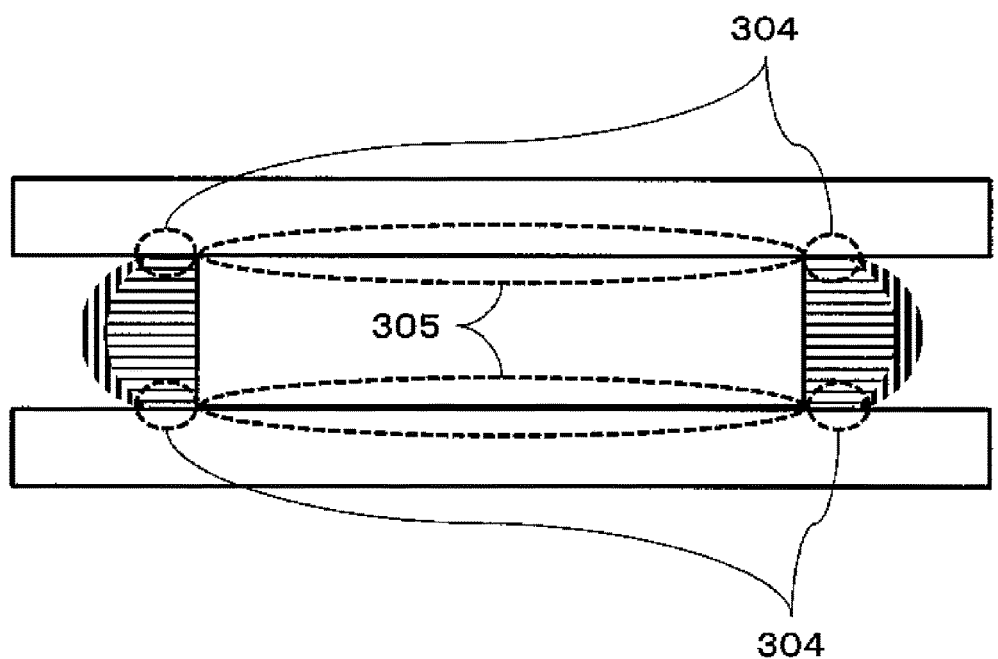
FIG. 3E A schematic view showing a fluidized surface and a non-fluidized surface.

FIG. 3D is a schematic view showing the state where the surface is solidified to stop the flow. While FIG. 3C schematically depicts the flow started by pressing, the 303-2 portion in FIG. 3C is solidified due to cooling and forms a solidified surface shown by 303-3 in FIG. 3D.

5. Step 5

Step 5 is a step of, after cooling, opening the mold and taking out a molded product from the mold. In the case where a step of actuating an ejector is provided between step 4 and step 5 for the purpose of assisting in step 5, this is advantageous in that the molding operation can be simplified and a molding trouble, etc. can be prevented.

As for the ejector, both a method of blowing compressed air and a method of pushing up the product by a mechanical structural member may be preferably used.

The manufacturing method of a press-molded product of the present invention includes steps 1 to 5 in order of step 1, step 2, step 3, step 4 and step 5 and may include other steps.

6. Conclusion

Figure 5:
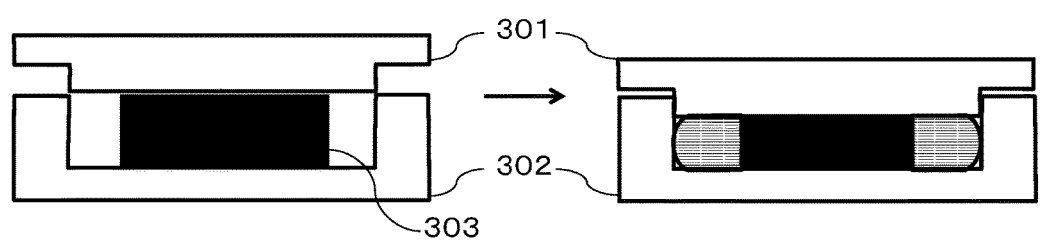
FIG. 5 A schematic view showing a case where the manufacturing method of a press-molded product of the present invention is used.

The degree of freedom in shape of the molded product is enhanced by using the manufacturing method described in the foregoing pages. This means that since a composite material is rapidly fluidized and shaped, the shaping can be completed before the temperature of the composite material drops to the plasticization temperature or less (see, FIG. 5).

(Conventional Cold Press)

The conventional cold press is indicated by a dashed line 102 in "Relationship of Pressure in Press Mold and Time" of FIG. 1A and takes time until flow is started.

As a result, the time of forming a fluidized surface is delayed, and the temperature of the composite material has dropped below the plasticization temperature when press-molding a fluidized surface and is not enough to ensure good surface appearance.

Figure 4:
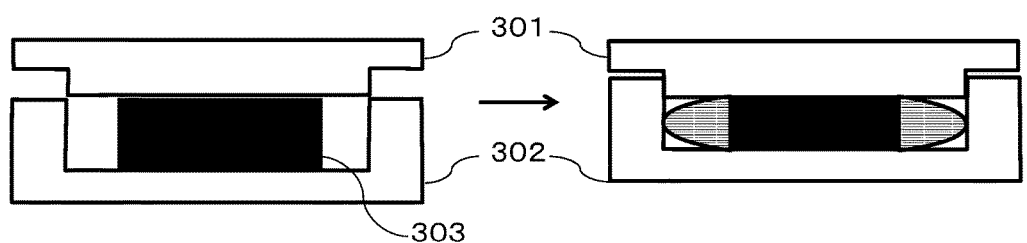
FIG. 4 A schematic view showing a case where a conventional manufacturing method of a press-molded product is used.

That is, the temperature of the composite material is reduced to the plasticization temperature or less before the composite material flows (see, FIG. 4).

In "Relationship of Pressure in Press Mold and Time" of FIG. 1A, the solid line 101 indicates the behavior in an example of the press molding of the present invention.

[Press Molding Apparatus]

The press molding apparatus in the present invention is an apparatus for manufacturing a press-molded product by cold-pressing a composite material containing a discontinuous carbon fiber and a thermoplastic resin, wherein said cold press satisfies equations (1) and (2) and includes Steps 1 to 5, the apparatus including a speed-increasing device provided in a mold opening and closing machine:

Step 1 is a step of placing a heated composite material in a mold;

Step 2 is a step of allowing 1 second or less between pressurization start time t0 and time t1 of reaching flow starting pressure Pf;

Step 3 is a step of reaching maximum pressure Pm at time t2;

Step 4 is a pressure holding step of pressing the composite material at average holding pressure Pk from time t2 to time t3; and Step 5 is a step of opening the mold and taking out a molded product from the mold:

equation (1): $4 < Pf/t1 < 7,500$ [MPa/sec]; and equation (2): $45 < Pk \times (t3-t2) < 5,400$ [MPa·sec].

Here, the cold press of the composite material, steps 1 to 5, equations (1) and (2) are as already described above. A preferred embodiment of the press molding apparatus is described below.

In the present invention, the attention should be focused on the opening and closing behavior of the mold for use in the cord press at the time of manufacture of a press-molded product. The mechanism for opening and closing the mold is not limited but includes, for example, a toggle type and a direct pressure type, and as for the power source, various mechanisms and powers, such as hydraulic pressure or servo motor, are known. In order to realize "Step 3: a step of reaching maximum pressure Pm at time t2" in the present invention, the press pressure needs to be raised in a short time in several seconds when cold-pressing the composite material placed in a mold. Therefore, it is preferable to use a mold opening and closing machine using a high-speed servo motor, use a hydraulic pressure pump with a large discharge amount in a hydraulic pressure circuit, or use a mold opening and closing machine having provided therein a speed-increasing device. Among others, a mold opening and closing machine of a hydraulic-pressure direct-pressure type in which an accumulator tank is provided as the speed-increasing device, is preferably used.

More specifically, hydraulic pressure is accumulated in the accumulator tank and when clamping the mold, the hydraulic pressure in the tank is released, whereby the accumulator tank can temporarily increase the pressure rise rate. In addition, the mold opening and closing machine of a hydraulic-pressure direct-pressure type can be preferably used also from the standpoint that a high pressure can be maintained for a long time.

In the case of using an accumulator tank as the speed-increasing device, the timing of opening of the accumulator tank and the capacity of the accumulator tank are important. In the case of obtaining a flat press-molded product, the speed-increasing effect is preferably exerted at the timing of contact of the upper mold of the mold with the composite material. Taking into account, e.g., the delay of hydraulic pressure transmission time, the accumulator tank is preferably opened at the timing of arrival of the upper mold of the mold at a position higher by 0 to 5 mm than the thickness of the composite material, because the capacity of accumulator tank can be small.

On the other hand, in the case of obtaining a cubic press-molded product having a recess and a projection, a wrinkle resulting from the composite material being drawn in and folded along the figure of the molded product in conjunction with clamping of the mold is sometimes generated. For obtaining a press-molded product having uniform wrinkles, the accumulator tank is preferably opened at the timing of start of the above-described drawing-in or folding so as to speed-up the upper mold of the mold.

In order for a wrinkle attributable to drawing-in and folding of the composite material to be eliminated by clamping of the mold, it is preferable to perform clamping of the mold at a high speed by using a small-diameter hydraulic pressure cylinder capable of low-pressure high-speed operation and open the accumulator tank while crushing the generated wrinkle, because an excessive pressure is not needed and this is advantageous in view of equipment.

The method for controlling the accumulator tank is preferably, for example, a position control method using the sliding position of the upper mold of the mold, and as a simpler method, the accumulator tank may also be controlled by the pressure control of hydraulic pressure. Specifically, a large pressure has been required to crush a wrinkle resulting from the composite material being drawing-in and folded along the figure of the molded product in conjunction with clamping of the mold, but when the method of opening the accumulator tank at the timing of arrival of the hydraulic pressure of the small-diameter hydraulic pressure cylinder capable of low-pressure high-speed operation at a predetermined pressure is used, a large pressure is not required of a cylinder provided in the manufacturing apparatus. At this time, a small-size molding machine having a short hydraulic pressure transmission time is preferred so as to generate no delay of the hydraulic pressure transmission time.

[Structure of Mold]

The product shape is not particularly limited, and the mold for use in the present invention preferably has a shear edge structure and has a structure where when the mold is completely closed, the cavity inside the mold becomes an enclosed space.

Since the cavity inside the mold forms an enclosed space, a molded product having a uniform appearance up to the end part of a press-molded product can be easily obtained.

In this connection, use of the manufacturing method of a molded product of the present invention makes it possible to manufacture a molded product having a relatively good surface appearance even by using a so-called open cavity. In the case of using a so-called open cavity not taking on a structure of forming an enclosed space, the composite material flows without allowing the leading end of flow to come into contact with the mold, and it has been conventionally difficult to have the same appearance on the fluidized surface and on the non-fluidized surface, but when the manufacturing method of a molded product of the present invention is used, the fluidized surface and the non-fluidized are pressurized substantially at the same time, so that a molded product relatively free of a difference in the surface appearance between the fluidized surface and the non-fluidized surface can be manufactured.

EXAMPLES

The present invention is specifically described below by referring to Examples, but the present invention is not limited thereto. The raw materials used in Reference Examples below are as follows. Here, the decomposition temperature is a measurement result of thermogravimetric analysis.

PAN-Based Carbon Fiber:

Carbon fiber "TENAX" (registered trademark) STS40-24KS produced by Toho Tenax Co., Ltd. (average fiber diameter: 7 μm).

Polyamide 6:

Hereinafter, simply referred to as PA6; crystalline resin, melting point: 225° C., decomposition temperature (in air): 300° C.

Polypropylene:

Hereinafter, simply referred to as PP; crystalline resin, melting point: 170° C., decomposition temperature (in air): 300° C.

Polycarbonate:

Hereinafter, simply referred to as PC; amorphous resin, glass transition point: 150° C., decomposition temperature (in air): 420° C.

(1) Analysis of Carbon Fiber Volume Fraction (Vf)

The composite material was treated in a furnace under the conditions of 500° C.×1 hour to remove the thermoplastic resin by combustion, and the mass of the sample before and after the treatment was weighed, whereby the masses of the carbon fiber portion and the thermoplastic resin were calculated. Next, the volume fractions of carbon fiber and thermoplastic resin were calculated using the specific gravity of each component. As regards the press-molded product, the volume fraction of carbon fiber contained is also indicated by Vf.

equation (6):  $Vf=100\times$volume of carbon fiber/(volume of carbon fiber+volume of thermoplastic resin)

(2) Analysis of Average Fiber Length of Carbon Fiber Contained in Composite Material As for the average fiber length of the carbon fiber contained in the composite material, after removing the thermoplastic resin in a furnace under the conditions of approximately 500° C.×1 hour, the lengths of randomly extracted 100 fibers were measured down to a unit of 1 mm by using a vernier caliper and a magnifying lens and recorded, and from the lengths (Li, wherein i is an integer of 1 to 100) of all carbon fibers measured, the weight average fiber length (Lw) was determined according to the following equation:

$Lw=(\Sigma Li^2)/(\Sigma Li)$　　　　equation (5)

The average fiber length of the carbon fiber in the press-molded product can also be measured by the same method as above.

(3) Evaluation of Surface Appearance of Press-Molded Product

For the purpose of evaluating the surface appearance (smoothness) on the surface of the press-molded product, the surface of the molded product was evaluated with an eye, by an optical microscope, and by touch with hand Excellent: The surface Ra ratio (non-fluidized part/fluidized part) in the non-fluidized part and the fluidized part is from 0.8 to 1.0; in the evaluation with an eye, the surface was free of a (dry) region with insufficient impregnation of the resin into the carbon fiber, a wrinkle, or the like and was a smooth surface.

Good: The surface Ra ratio (non-fluidized part/fluidized part) in the non-fluidized part and the fluidized part is from 0.5 to 0.8.

Better: The surface Ra ratio (non-fluidized part/fluidized part) in the non-fluidized part and the fluidized part is from 0.1 to 0.5; in the evaluation with an eye, a dry region, a wrinkle or roughness was slightly observed.

Bad: The surface Ra ratio (non-fluidized part/fluidized part) in the non-fluidized part and the fluidized part is 0.1 or less; in the evaluation with an eye, many dry regions or wrinkles were observed, or the surface of the molded product was uneven, leading to a serious fault.

However, even a press-molded product having surface appearance evaluated as "bad" can be used without a problem in the case of using it, e.g., in a portion not requiring consideration of surface appearance.

(4) Evaluation of Moldability

For the purpose of evaluating the moldability, shape observation of the press-molded product was carried out.

Excellent: The product was evaluated to be best when the molded product is filled, even in the end part, with carbon fiber and thermoplastic resin and had no defect and the thickness is uniform in the region of 0 to 10 mm from the distal part.

Good: The product was evaluated to be good when the molded product is filled, even in the end part, with carbon fiber and thermoplastic resin and has no defect.

Better: The product was evaluated to be defective when chipping or a fault is partially observed.

Bad: The product was evaluated to be seriously defective when many chippings or faults are observed.

Reference Example 1

Using, as the reinforcing fiber, carbon fiber "Tenax" (registered trademark) STS40-24KS (average fiber diameter: 7 μm) produced by Toho Tenax Co., Ltd., which was treated with a nylon-based sizing agent, and using, as the thermoplastic resin, nylon 6 resin A1030 produced by Unitika Ltd., an isotropic material having a carbon fiber areal weight of 1,800 g/m$^2$ and a nylon resin areal weight of 1,500 g/m$^2$ was prepared based on the method described in WO2012/105080, pamphlet, preheated at 240° C. for 90 seconds, and then hot-pressed at 240° C. for 180 seconds while applying a pressure of 2.0 MPa.

Subsequently, the material was cooled to 50° C. in the pressurized state to obtain a flat sheet of a composite material, having a thickness of 2.6 mm and a carbon fiber volume fraction (Vf)=35%, and this is designated as Composite Material 1. The average fiber length was 30 mm, and the in-plane isotropy (Eδ) was 1.1. The size of Composite Material 1 was 1.2 m×1.2 m.

Reference Examples 2 and 3

Composite materials were prepared in the same manner as in Reference Example 1 except for changing the carbon fiber volume fraction (Vf) of the composite material to 30% and 40% and designated as Composite Material 2 and Composite Material 3, respectively.

Reference Example 4

A composite material was prepared in the same manner as in Reference Example 1 except for changing the thermoplastic resin to polycarbonate "Panlite" (registered trademark) L-1225WP produced by Teijin Limited and designated as Composite Material 4.

Reference Examples 5, 6 and 7

Composite materials were prepared in the same manner as in Reference Example 1 except for changing the thickness of the composite material to 1 mm, 5 mm and 10 mm and designated as Composite Materials 5, 6 and 7, respectively.

Reference Example 8

Using, as the reinforcing fiber, carbon fiber "Tenax" (registered trademark) HTC110 (average fiber diameter: 7 μm, fiber length: 6 mm) produced by Toho Tenax Co., Ltd., a papermaking base material was prepared by the method described in JP-A-2014-09503.

Specifically, a liquid dispersion consisting of water and a surfactant (polyoxyethylene lauryl ether) and having a concentration of 0.1 wt % was produced and using this liquid dispersion and the carbon fiber above, a papermaking base material was manufactured by means of a manufacturing apparatus of a papermaking base material. The width of the composite material obtained was 500 mm, the length was 500 mm, and the areal weight was 180 g/m$^2$.

In the state of a predetermined number of sheets of polyamide film (EMBLEM, produced by Unitika Ltd., thickness: 15 μm) being sandwiched between the papermaking base materials obtained, 10 sheets of the papermaking base material were stacked, preheated at 240° C. for 90 seconds, and then hot-pressed at 240° C. for 180 seconds while applying a pressure of 2.0 MPa. Thereafter, the layered body was cooled to 50° C. in the pressurized state to obtain a flat sheet of a carbon fiber composite material having a thickness of 2 mm and a carbon fiber volume fraction (Vf)=20%, and this flat sheet is designated as Composite Material 8.

[Manufacture of Press-Molded Product]

Example 1

1. Step 1

Composite Material 1 was heated at 290° C. that is not less than the plasticization temperature of polyamide 6 (thermoplastic resin), by using a resin sheet heating apparatus (Model: H7GS-73408) manufactured by NGK Kiln Tech, Corp. and placed in the lower mold of a mold (open cavity) set at 150° C., and a flat-sheet press-molded product was prepared. In a molding machine, a speed-increasing device (Model: TL350-220-20, manufactured by Nakamura Koki Co., Ltd.) was provided.

2. Step 2

Using a 2,000 tf (20,000 kN) molding machine (Model: TMP2-2000) manufactured by Kawasaki Hydromechanics Corp., the upper mold of the metal mold was moved downward at a pressurization rate of 100 mm/sec, the pressurization was started by bringing the upper mold into contact with the composite material, and 5 MPa that is the flow starting pressure Pf was reached in 0.025 seconds (time t1) from pressurization start time t0. Here, the pressurization start time t0 was defined as a time when the pressure was measured on the output pressure value of the molding machine.

3. Step 3

After reaching the flow starting pressure Pf, the upper mold of the mold was further moved downward to apply a pressure, and 30 MPa (maximum pressure Pm) was reached in 0.2 seconds (time t2) from pressurization start time t0.

4. Step 4

After reaching maximum pressure Pm, Composite Material 1 was kept in the state of 20 MPa (average holding pressure Pk) for 10 seconds (time t3−time t2).

5. Step 5

The upper mold of the mold was moved upward to completely open the mold, a press-molded product produced was removed from the lower mold by means of an ejector rod, and the press-molded product was taken out. The press-molded product taken out was evaluated for each of surface appearance and moldability as described above.

The results are shown in Table 1.

Examples 2 to 6

Examples 2 to 6 were carried out by performing the press molding in the same manner as in Example 1 except that the time t1 in step 2 was changed to 0.125 [sec], 0.25 [sec], 0.5 [sec], 0.75 [sec] and 1.0 [sec], respectively, the time t2 in step 3 was changed to 0.7 [sec], 1.2 [sec], 2.0 [sec], 3.5 [sec] and 4.0 [sec], respectively, and the maximum pressure Pm was changed to 25 [MPa], 23 [MPa], 22 [MPa], 22 [MPa] and 20 [MPa], respectively, and respective press-molded products were thereby obtained.

The results are shown in Table 1.

Comparative Example 1

A comparative press-molded product was obtained by performing the press molding in the same manner as in Example 1 except that the time t1 in step 2 was changed to 1.25 [sec], the time t2 in step 3 was changed to 5.0 [sec], and the maximum pressure Pm was changed to 20 [MPa].

In the press-molded product obtained, the distal part of the molded product was in the unfilled state, and both the evaluation of moldability and the evaluation of surface appearance were "bad".

The results are shown in Table 1.

Examples 7 and 8

Examples 7 and 8 were carried out by performing the press molding in the same manner as in Example 1 except that the pressure holding time (t3−t2) was changed to 40 [sec] and 30 [sec], respectively, and press-molded products were thereby obtained.

The results are shown in Table 1.

Example 9

A press-molded product was obtained by performing the press molding in the same manner as in Example 3 except that the time t2 in step 3 was changed to 0.7 [sec], the maximum pressure Pm was changed to 12 [MPa], and the average holding pressure Pk was changed to 10 [MPa]. The results are shown in Table 1.

Example 10

A press-molded product was obtained by performing the press molding in the same manner as in Example 3 except that the pressure holding time (t3−t2) was changed to 5.0 [sec]. The results are shown in Table 1.

Example 11

A press-molded product was obtained by performing the press molding in the same manner as in Example 4 except that the time t2 in step 3 was changed to 1.1 [sec], the maximum pressure Pm was changed to 11 [MPa], and the average holding pressure Pk was changed to 10 [MPa]. The results are shown in Table 1.

Comparative Example 2

A comparative press-molded product was obtained by performing the press molding in the same manner as in Example 11 except that the pressure holding time (t3−t2) was changed to 1.0 [sec]. The results are shown in Table 1.

Examples 12 and 13

Press-molded products were obtained by performing the press molding in the same manner as in Example 3 except that in step 1, the composite material was heated at 300° C. and 280° C., respectively. The results are shown in Table 2.

Examples 14 to 16

Press-molded products were obtained by performing the press molding in the same manner as in Example 3 except for using Composite Materials 2 to 4. The results are shown in Table 2.

Example 17

A press-molded product was obtained by performing the press molding in the same manner as in Example 1 except for using Composite Material 5. The results are shown in Table 2.

Example 18

A press-molded product was obtained by performing the press molding in the same manner as in Example 17 except that the maximum pressure Pm was changed to 7 [MPa], the average holding pressure Pk was changed to 5 [MPa], and the time t2 in step 3 was changed to 0.04 [sec]. The results are shown in Table 2.

Comparative Example 3

A comparative press-molded product was obtained by performing the press molding in the same manner as in Example 17 except that the maximum pressure Pm was changed to 6 [MPa], the average holding pressure Pk was changed to 4 [MPa], and the time t2 in step 3 was changed to 0.035 [sec]. The results are shown in Table 2.

Example 19

A press-molded product was obtained by performing the press molding in the same manner as in Example 3 except for using Composite Material 6. The results are shown in Table 2.

Example 20

A press-molded product was obtained by performing the press molding in the same manner as in Example 19 except that the maximum pressure Pm was changed to 35 [MPa], the average holding pressure Pk was changed to 30 [MPa], the pressure holding time (t3−t2) was changed to 120 [sec], and the time t2 in step 3 was changed to 1.8 [sec]. The results are shown in Table 2.

Example 21

A press-molded product was obtained by performing the press molding in the same manner as in Example 3 except for using Composite Material 7. The results are shown in Table 2.

Example 22

A press-molded product was obtained by performing the press molding in the same manner as in Example 21 except that the maximum pressure Pm was changed to 35 [MPa], the time t2 in step 3 was changed to 1.8 [sec], the average holding pressure Pk was changed to 30 [MPa], the pressure holding time (t3–t2) was changed to 180 [sec]. The results are shown in Table 2.

Comparative Example 4

A comparative press-molded product was obtained by performing the press molding in the same manner as in Example 22 except that the pressure holding time (t3–t2) was changed to 185 [sec]. The results are shown in Table 2.

The moldability and surface appearance of the molded product obtained were "excellent", but since the too long molding time is disadvantageous in view of the production process, this is categorized into Comparative Example.

Example 23

A press-molded product was obtained by performing the press molding in the same manner as in Example 3 except for using Composite Material 8.

Example 24

A press-molded product was obtained by performing the press molding in the same manner as in Example 4 except that press was carried out without using a speed-increasing device and the time t2 in step 3 was changed to 5.0 [sec].

Example 25

The press molding was performed in the same manner as in Example 7 except that for the purpose of performing the press molding at a high speed as much as possible, the time t1 was changed to $1.0 \times 10^{-3}$ [sec] and the time t2 was changed to 0.05. At this time, the maximum pressure cannot be measured due to a problem of machine accuracy.

Comparative Example 5

It was attempted to shorten the time until reaching the time t1 after the time t0 to $6.5 \times 10^{-4}$ [sec], but since the molding machine was about to be broken, the experiment was stopped.

TABLE 1

|  |  | Example 1 | Example 2 | Example 3 | Example 4 | Example 5 |
|---|---|---|---|---|---|---|
| Composite material |  | Composite Material 1 | Composite Material 1 | Composite Material 1 | Composite Material 1 | Composite Material 1 |
| Thickness h | [mm] | 2.6 | 2.6 | 2.6 | 2.6 | 2.6 |
| Vf | [%] | 35 | 35 | 35 | 35 | 35 |
| Thermoplastic resin | — | PA6 | PA6 | PA6 | PA6 | PA6 |
| Press conditions |  |  |  |  |  |  |
| Heating temperature of composite material | [° C.] | 290 | 290 | 290 | 290 | 290 |
| <Step 2> |  |  |  |  |  |  |
| Flow starting pressure Pf | [MPa] | 5 | 5 | 5 | 5 | 5 |
| From pressurization start time t0 to time t1 of reaching flow starting pressure Pf | [sec] | 0.025 | 0.125 | 0.25 | 0.5 | 0.75 |
| Pf/t1 | [MPa/sec] | 200 | 40 | 20 | 10 | 6.7 |
| <Step 3> |  |  |  |  |  |  |
| Maximum pressure Pm | [MPa] | 30 | 25 | 23 | 22 | 22 |
| From pressurization start time t0 to time t2 of reaching maximum pressure Pm | [sec] | 0.2 | 0.7 | 1.2 | 2.0 | 3.5 |
| (Pm − Pf)/(t2 − t1) | [MPa/sec] | 143 | 35 | 19 | 11 | 6 |
| <Step 4> |  |  |  |  |  |  |
| Average holding pressure Pk | [MPa] | 20 | 20 | 20 | 20 | 20 |
| Pk/Pm |  | 0.67 | 0.80 | 0.87 | 0.91 | 0.91 |
| Pressure holding time t3 − t2 | [sec] | 10 | 10 | 10 | 10 | 10 |
| Pk×(t3 − t2) |  | 200 | 200 | 200 | 200 | 200 |
| Mold |  |  |  |  |  |  |
| Speed-increasing device |  | used | used | used | used | used |
| Evaluation of press-molded product |  |  |  |  |  |  |
| Moldability |  | excellent | excellent | excellent | good | better |
| Surface appearance |  | excellent | excellent | good | better | better |

|  |  | Example 6 | Comparative Example 1 | Example 7 | Example 8 |
|---|---|---|---|---|---|
| Composite material |  | Composite Material 1 | Composite Material 1 | Composite Material 1 | Composite Material 1 |
| Thickness h | [mm] | 2.6 | 2.6 | 2.6 | 2.6 |
| Vf | [%] | 35 | 35 | 35 | 35 |
| Thermoplastic resin | — | PA6 | PA6 | PA6 | PA6 |
| Press conditions |  |  |  |  |  |
| Heating temperature of composite material | [° C.] | 290 | 290 | 290 | 290 |

TABLE 1-continued

| <Step 2> | | | | | |
|---|---|---|---|---|---|
| Flow starting pressure Pf | [MPa] | 5 | 5 | 5 | 5 |
| From pressurization start time t0 to time t1 of reaching flow starting pressure Pf | [sec] | 1.0 | 1.25 | 0.025 | 0.025 |
| Pf/t1 | [MPa/sec] | 5 | 4 | 200 | 200 |
| <Step 3> | | | | | |
| Maximum pressure Pm | [MPa] | 20 | 20 | 30 | 30 |
| From pressurization start time t0 to time t2 of reaching maximum pressure Pm | [sec] | 4.0 | 5.0 | 0.2 | 0.2 |
| (Pm − Pf)/(t2 − t1) | [MPa/sec] | 5 | 4 | 143 | 143 |
| <Step 4> | | | | | |
| Average holding pressure Pk | [MPa] | 20 | 20 | 20 | 20 |
| Pk/Pm | | 1.0 | 1.0 | 0.67 | 0.67 |
| Pressure holding time t3 − t2 | [sec] | 10 | 10 | 40 | 30 |
| Pk×(t3 − t2) | | 200 | 200 | 800 | 600 |
| Mold | | | | | |
| Speed-increasing device | | used | used | used | used |
| Evaluation of press-molded product | | | | | |
| Moldability | | better | bad | excellent | excellent |
| Surface appearance | | bad | bad | excellent | excellent |

| | | Example 9 | Example 10 | Example 11 | Comparative Example 2 |
|---|---|---|---|---|---|
| Composite material | | Composite Material 1 | Composite Material 1 | Composite Material 1 | Composite Material 1 |
| Thickness h | [mm] | 2.6 | 2.6 | 2.6 | 2.6 |
| Vf | [%] | 35 | 35 | 35 | 35 |
| Thermoplastic resin | — | PA6 | PA6 | PA6 | PA6 |
| Press conditions | | | | | |
| Heating temperature of composite material | [° C.] | 290 | 290 | 290 | 290 |
| <Step 2> | | | | | |
| Flow starting pressure Pf | [MPa] | 5 | 5 | 5 | 5 |
| From pressurization start time t0 to time t1 of reaching flow starting pressure Pf | [sec] | 0.25 | 0.25 | 0.5 | 0.5 |
| Pf/t1 | [MPa/sec] | 20 | 20 | 10 | 10 |
| <Step 3> | | | | | |
| Maximum pressure Pm | [MPa] | 12 | 23 | 11 | 11 |
| From pressurization start time t0 to time t2 of reaching maximum pressure Pm | [sec] | 0.7 | 1.2 | 1.1 | 1.1 |
| (Pm − Pf)/(t2 − t1) | [MPa/sec] | 16 | 19 | 10 | 10 |
| <Step 4> | | | | | |
| Average holding pressure Pk | [MPa] | 10 | 20 | 10 | 10 |
| Pk/Pm | | 0.83 | 0.87 | 0.91 | 0.91 |
| Pressure holding time t3 − t2 | [sec] | 10 | 5.0 | 10 | 1.0 |
| Pk×(t3 − t2) | | 100 | 100 | 100 | 10 |
| Mold | | | | | |
| Speed-increasing device | | used | used | used | used |
| Evaluation of press-molded product | | | | | |
| Moldability | | good | good | better | bad |
| Surface appearance | | better | better | better | bad |

TABLE 2

| | | Example 12 | Example 13 | Example 14 | Example 15 | Example 16 |
|---|---|---|---|---|---|---|
| Composite material | | Composite Material 1 | Composite Material 1 | Composite Material 2 | Composite Material 3 | Composite Material 4 |
| Thickness h | [mm] | 2.6 | 2.6 | 2.6 | 2.6 | 2.6 |
| Vf | [%] | 35 | 35 | 30 | 40 | 35 |
| Thermoplastic resin | — | PA6 | PA6 | PA6 | PA6 | PC |

TABLE 2-continued

| Press conditions | | | | | | |
|---|---|---|---|---|---|---|
| Heating temperature of composite material <Step 2> | [° C.] | 300 | 280 | 290 | 290 | 290 |
| Flow starting pressure Pf | [MPa] | 5 | 5 | 5 | 5 | 5 |
| From pressurization start time t0 to time t1 of reaching flow starting pressure Pf | [sec] | 0.25 | 0.25 | 0.25 | 0.25 | 0.25 |
| Pf/t1 <Step 3> | [MPa/sec] | 20 | 20 | 20 | 20 | 20 |
| Maximum pressure Pm | [MPa] | 23 | 23 | 23 | 23 | 23 |
| From pressurization start time t0 to time t2 of reaching maximum pressure Pm | [sec] | 1.2 | 1.2 | 1.2 | 1.2 | 1.2 |
| (Pm − Pf)/(t2 − t1) <Step 4> | [MPa/sec] | 19 | 19 | 19 | 19 | 19 |
| Average holding pressure Pk | [MPa] | 20 | 20 | 20 | 20 | 20 |
| Pk/Pm | | 0.87 | 0.87 | 0.87 | 0.87 | 0.87 |
| Pressure holding time t3 − t2 | [sec] | 10 | 10 | 10 | 10 | 10 |
| Pk×(t3 − t2) | | 200 | 200 | 200 | 200 | 200 |
| Mold | | | | | | |
| Speed-increasing device | | used | used | used | used | used |
| Evaluation of press-molded product | | | | | | |
| Moldability | | excellent | good | excellent | good | excellent |
| Surface appearance | | excellent | better | excellent | good | excellent |

| | | Example 17 | Example 18 | Comparative Example 3 | Example 19 | Example 20 |
|---|---|---|---|---|---|---|
| Composite material | | Composite Material 5 | Composite Material 5 | Composite Material 5 | Composite Material 6 | Composite Material 6 |
| Thickness h | [mm] | 1 | 1 | 1 | 5 | 5 |
| Vf | [%] | 35 | 35 | 35 | 35 | 35 |
| Thermoplastic resin | — | PA6 | PA6 | PA6 | PA6 | PA6 |
| Press conditions | | | | | | |
| Heating temperature of composite material <Step 2> | [° C.] | 290 | 290 | 290 | 290 | 290 |
| Flow starting pressure Pf | [MPa] | 5 | 5 | 5 | 5 | 5 |
| From pressurization start time t0 to time t1 of reaching flow starting pressure Pf | [sec] | 0.025 | 0.025 | 0.025 | 0.25 | 0.25 |
| Pf/t1 <Step 3> | [MPa/sec] | 200 | 200 | 200 | 20 | 20 |
| Maximum pressure Pm | [MPa] | 30 | 7 | 6 | 23 | 35 |
| From pressurization start time t0 to time t2 of reaching maximum pressure Pm | [sec] | 0.2 | 0.04 | 0.035 | 1.2 | 1.8 |
| (Pm − Pf)/(t2 − t1) <Step 4> | [MPa/sec] | 143 | 133 | 100 | 19 | 19 |
| Average holding pressure Pk | [MPa] | 20 | 5 | 4 | 20 | 30 |
| Pk/Pm | | 0.67 | 0.71 | 0.67 | 0.87 | 0.86 |
| Pressure holding time t3 − t2 | [sec] | 10 | 10 | 10 | 10 | 120 |
| Pk×(t3 − t2) | | 200 | 50 | 40 | 200 | 3600 |
| Mold | | | | | | |
| Speed-increasing device | | used | used | used | used | used |
| Evaluation of press-molded product | | | | | | |
| Moldability | | excellent | good | bad | excellent | excellent |
| Surface appearance | | good | good | bad | excellent | excellent |

| | | Example 21 | Example 22 | Comparative Example 4 | Example 23 | Example 24 |
|---|---|---|---|---|---|---|
| Composite material | | Composite Material 7 | Composite Material 7 | Composite Material 7 | Composite Material 8 | Composite Material 1 |
| Thickness h | [mm] | 10 | 10 | 10 | 2 | 2.6 |
| Vf | [%] | 35 | 35 | 35 | 20 | 35 |
| Thermoplastic resin | — | PA6 | PA6 | PA6 | PA6 | PA6 |

TABLE 2-continued

| Press conditions | | | | | | |
|---|---|---|---|---|---|---|
| Heating temperature of composite material <Step 2> | [° C.] | 290 | 290 | 290 | 290 | 290 |
| Flow starting pressure Pf | [MPa] | 5 | 5 | 5 | 5 | 5 |
| From pressurization start time t0 to time t1 of reaching flow starting pressure Pf | [sec] | 0.25 | 0.25 | 0.25 | 0.25 | 0.5 |
| Pf/t1 <Step 3> | [MPa/sec] | 20 | 20 | 20 | 20 | 10 |
| Maximum pressure Pm | [MPa] | 23 | 35 | 35 | 23 | 22 |
| From pressurization start time t0 to time t2 of reaching maximum pressure Pm | [sec] | 1.2 | 1.8 | 1.8 | 1.2 | 5.0 |
| (Pm − Pf)/(t2 − t1) <Step 4> | [MPa/sec] | 19 | 19 | 19 | 19 | 4 |
| Average holding pressure Pk | [MPa] | 20 | 30 | 30 | 20 | 20 |
| Pk/Pm | | 0.87 | 0.86 | 0.86 | 0.87 | 0.91 |
| Pressure holding time t3 − t2 | [sec] | 10 | 180 | 185 | 10 | 10 |
| Pk×(t3 − t2) | | 200 | 5400 | 5550 | 200 | 200 |
| Mold | | | | | | |
| Speed-increasing device | | used | used | used | used | none |
| Evaluation of press-molded product | | | | | | |
| Moldability | | excellent | excellent | excellent | better | better |
| Surface appearance | | excellent | excellent | excellent | better | bad |

TABLE 3

| | | Example 25 | Comparative Example 5 |
|---|---|---|---|
| Composite material | | 1 | 1 |
| Thickness h | [mm] | 2.6 | 2.6 |
| Vf | [%] | 35 | 35 |
| Thermoplastic resin | — | PA6 | PA6 |
| Press conditions | | | |
| Heating temperature of composite material <Step 2> | [° C.] | 290 | 290 |
| Flow starting pressure Pf | [MPa] | 5 | 5 |
| From pressurization start time t0 to time t1 of reaching flow starting pressure Pf | [sec] | 0.001 | 0.00065 |
| Pf/t1 <Step 3> | [MPa/sec] | 5000 | 7692 |
| Maximum pressure Pm | [MPa] | detection limit or more | — |
| From pressurization start time t0 to time t2 of reaching maximum pressure Pm | [sec] | 0.05 | — |
| (Pm − Pf)/(t2 − t1) <Step 4> | [MPa/sec] | — | — |
| Average holding pressure Pk | [MPa] | 20 | — |
| Pk/Pm | | detection limit or more | — |
| Pressure holding time t3 − t2 | [sec] | 40 | — |
| Pk × (t3 − t2) | | 800 | — |
| Mold | | | |
| Speed-increasing device | | used | used |
| Evaluation of press-molded product | | | |
| Moldability | | excellent | — |
| Surface appearance | | excellent | — |

INDUSTRIAL APPLICABILITY

A press-molded product obtained using the composite material of the present invention can be thin-walled or isotropic and therefore, can be used for various structural members, e.g., an inner plate, an outer plate, and a structural member of automobiles, for various electrical products, or for a frame, a housing, or the like of machines.

DESCRIPTION OF REFERENCE NUMERALS AND SIGNS

101: A solid line showing one embodiment of the present invention in the relationship of "Time-Pressure in Press Mold"
102: A dashed line showing a conventional manufacturing method of a press-molded product in the relationship of "Time-Pressure in Press Mold"
103: A gradient of Pf/t1
104: A range of Pk×(t3−t2)
105: A gradient of (Pm−Pf)/(t2−t1)
301: An example of the upper mold of the mold for use in the manufacturing method of a press-molded product
302: An example of the lower mold of the mold for use in the manufacturing method of a press-molded product
303: An example of the composite material placed in a mold
h: Thickness of composite material before heating
h(1+α): Thickness of composite material, assuming that the expansion coefficient when expanded by undergoing spring back is α
303-1: Composite material
303-2: An example showing flow of composite material
303-3: Thermoplastic resin surface cooled to not more than plasticization temperature
304: Fluidized surface
305: Non-fluidized surface

The invention claimed is:

1. A method for manufacturing a press-molded product comprising:

placing a heated composite material in a mold, wherein the composite material contains a discontinuous carbon fiber having an average fiber length from 1 to 100 mm and a thermoplastic resin;

allowing greater than 0 and 1 second or less between pressurization start time t0 and time t1 of reaching flow starting pressure Pf at which the composite material starts flowing after the composite material is pressurized by an upper mold to reduce a thickness of the composite material compared to the thickness of the composite material before heating;

reaching maximum pressure Pm at time t2;

cold-pressing the composite material at an average holding pressure Pk from time t2 to time t3, wherein the average holding pressure Pk is from 0.1 to 50 MPa, and the average holding pressure Pk and the maximum pressure Pm satisfy 0.5<Pk/Pm<1.0; and opening the mold and taking out a molded product from the mold; wherein the method satisfies equations (1) and (2):

equation (1): $4<Pf/t1<7,500$; and equation (2): $45<Pk\times(t3-t2)<5,400$, wherein a unit of Pf/t1 is MPa/sec and a unit of Pk×(t3−t2) is MPa·sec.

2. The method for manufacturing a press-molded product according to claim 1, wherein a relationship between the maximum pressure Pm and the flow starting pressure Pf, and the times t1 and t2 satisfies equation (3):

equation (3): $4<(Pm-Pf)/(t2-t1)<7,500$, wherein a unit of (Pm−Pf)/(t2−t1) is MPa/sec.

3. The method for manufacturing a press-molded product according to claim 1, wherein the maximum pressure Pm is from 5 to 50 MPa.

4. The method for manufacturing a press-molded product according to claim 1, wherein a volume fraction of the carbon fiber contained in the composite material, defined by equation (6), is from 10 to 70 Vol %:

equation (6): $Vf=100\times$volume of carbon fiber/(volume of carbon fiber+volume of thermoplastic resin).

5. A method for manufacturing a press-molded product comprising:

placing a heated composite material in a mold, wherein the composite material contains a discontinuous carbon fiber and a polyamide resin;

allowing greater than 0 and 1 second or less between pressurization start time t0 and time t1 of reaching flow starting pressure Pf at which the composite material starts flowing after the composite material is pressurized by an upper mold to reduce a thickness of the composite material compared to the thickness of the composite material before heating;

reaching maximum pressure Pm at time t2;

cold-pressing the composite material at an average holding pressure Pk from time t2 to time t3, wherein the average holding pressure Pk is from 0.1 to 50 MPa, and the average holding pressure Pk and the maximum pressure Pm satisfy 0.5<Pk/Pm<1.0; and opening the mold and taking out a molded product from the mold; wherein the method satisfies equations (1) and (2):

equation (1): $4<Pf/t1<7,500$; and equation (2): $45<Pk\times(t3-12)<5,400$, wherein a unit of Pf/t1 is MPa/sec and a unit of Pk×(t3−t2) is MPa·sec.

6. The method for manufacturing a press-molded product according to claim 1, using a manufacturing apparatus in which a speed-increasing device is provided in a mold opening and closing machine.

7. The method for manufacturing a press-molded product according to claim 1, wherein the composite material flows to form a fluidized surface when the composite material is pressurized at a pressure larger than the flow starting pressure Pf.

* * * * *